Patented Aug. 18, 1925.

1,550,350

UNITED STATES PATENT OFFICE.

OTTO EISLEB, OF HOFHEIM, GERMANY, ASSIGNOR TO FARBWERKE VORM. MEISTER LUCIUS & BRÜNING, OF HOCHST-ON-THE-MAIN, GERMANY, A CORPORATION OF GERMANY.

ALKAMINESTERS OF THE P-AMINOBENZOIC ACIDS AND PROCESS OF MAKING SAME.

No Drawing.    Application filed January 5, 1925. Serial No. 659.

*To all whom it may concern:*

Be it known that I, OTTO EISLEB, a citizen of Germany, residing at Hofheim am Taunus, Germany, have invented certain new and useful Improvements in Alkaminesters of the p-Aminobenzoic Acids and Processes of Making Same, of which the following is a specification.

I have found that by esterifying N-mono-alkyl- and N-monoalkyloxyalkyl derivatives of the p-aminobenzoic acid with amino alcohols and by alkylating the p-aminobenzoic acid alkaminesters according to the usual methods, alkaminesters are obtained which are distinguished by their excellent efficacy as agents for producing surface anæsthesia and which, as numerous comparative tests have proved, are by far superior to cocaine as regards their active power. The new products constitute typical agents for producing surface anæsthesia and are, therefore, in the first place suitable for anæsthetizing the large complex of the mucous membranes.

The new bodies correspond to the formula:

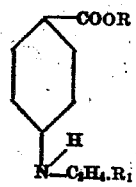

in which R stands for an alkamine residue and $R_1$ for an alkyl- or alkyloxy residue.

The products may be obtained by replacing in p-aminobenzoic acid in any desired order the hydrogen atom of the carboxyl group by an alkamine residue and by further replacing a hydrogen atom of the amino group by an alkyl- or alkyloxyalkyl residue containing more than two carbon atoms and then converting the bases thus obtained into their salts.

The following examples serve to illustrate my invention:

(1.) p-N-propylaminobenzoic acid-β-diethylaminoethylester: p-N-propylaminobenzoic acid may be obtained in the same way as Houben and Freund (Ber. 46, 3835) prescribed for the preparation of p-isoamyl-aminobenzoic acid, viz by boiling an aqueous solution of potassium-p-aminobenzoate with n-propylbromide. When purified by recrystallization from benzene the product melts at 165–168°. By titration there were found the molecular weight 178; calculated 179 for $C_{10}H_{13}O_2N$.

Equimolecular quantities of propylamino-benzoic acid and β-diethylamino ethylalcohol are dissolved or suspended in 10 times their weight of toluene; the mixture is saturated with hydrochloric acid gas and heated in an oil bath of about 150° while a current of hydrochloric acid gas is slowly passed through it so that toluene slowly distills over. Along with toluene the water produced by the esterification distills over. Duration about 8 hours. In order to work up the product some water is added after cooling until the salt is dissolved; the layer of toluene is separated and the base of the ester precipitated from the aqueous solution by means of a solution of sodium carbonate. By treating the oily base in ether, drying over potassium carbonate and adding alcoholic hydrochloric acid to the solution until it shows a neutral reaction on litmus, the monohydrochloride (M. P. 103–104°) is obtained in the form of a colorless crystalline powder.

Analysis: $C_{16}H_{27}O_2N_2Cl$:
Calculated N= 8.92%   Found= 8.75%
Cl=11.27%   =11.29%

(2.) p-N-β-methoxyethylaminobenzoic acid-β-diethylaminoethylester: p-N-β-methoxymethylaminobenzoic acid is produced by boiling an aqueous solution of sodium p-aminobenzoate with β-chlorethyl-methyl-ester. The product separating during the reaction is obtained in a pure state by recrystallization from alcohol. Melting point 159–161°. Molecular weight calculated $C_{10}H_{13}O_3N$: 195, by titration found 191.

A mixture of p-N-β-methoxyethylamino-benzoic acid and ten times its weight of ethylene chlorhydrine is saturated without cooling with hydrochlorid acid gas and maintained for some hours at a temperature of the water bath. By distilling off the excess of ethylene chlorohydrine in vacuo, decomposing the residue with a solution of sodium carbonate, treating the oil with ether, drying over potassium carbonate and distilling off the ether, there is obtained methoxyethylaminobenzoic acid-β-chloroethylester. The latter is immediately transformed into the β-diethylaminoethylester by boiling it for 10 hours using a condenser with a little more than 2 molecules of diethylamine. For the isolation of the β-diethylamino-ethylester the reaction product is disolved in an excess of diluted acetic acid, precipitated with a solution of sodium carbonate and the oil is treated with ether. The product is then dried over potassium carbonate and distilled. Boiling point 9 mm. 245°. The oil is colorless and odorless. The monohydrochloride is obtained by dissolving the ester in the equimolecular quantity of alcoholic hydrochloric acid and by mixing it with ether. It forms colorless crystals of the boiling point 86°.

Analysis: $C_{16}H_{27}O_3N_2Cl$:
Calculated N=8.49%   Found=8.19%

(3.) p-N-allylaminobenzoic acid-β-diethylaminoethylester: By shaking for some hours an aqueous solution of sodium p-aminobenzoate with allyl bromide a thick crystalline magma of p-N-allylaminobenzoic acid is obtained which by recrystallization and reprecipitation from benzene can easily be produced in a pure state; melting point 144–146°. Molecular weight calculated for $C_{10}H_{11}O_2N$ 177, found by titration 179.

The ethyl ester is produced by boiling the acid with alcohol and sulfuric acid under reflux and pouring the solution in an excess of a cold solution of sodium carbonate, whereupon it separates in a solid form. When recrystallized from benzene, it shows a melting point of 60–62°.

When the p-N-allylaminobenzoic acid ethylester is boiled with β-diethylamino-ethylalcohol while adding a small quantity of sodium ethylate, a replacement of alkyl occurs and ethyl alcohol distills over. By a subsequent distillation in vacuo the β-diethylamino-ethylester is obtained as a feebly yellowish oil; boiling point 10 mm. 232°.

Analysis for $C_{16}H_{24}O_2N_2$:
Calculated N=10.16%
Found     =10.00%

(4.) p-N-propylaminobenzoic acid γ-diethylamino-propylester: p-N-propylaminobenzoic acid ethylester (obtained in the known manner from the acid by way of esterification with ethyl alcohol, melting point 70°) and γ-diethylamino-propylalcohol in excess are heated while adding a small quantity of sodium ethylate. Ethylalcohol splits off and distills over. After having dissolved the remaining reaction product in ether, it is transformed into the monohydrochloride by mixing it with the calculated quantity of alcoholic hydrochloric acid and the monohydrochloride is obtained in a pure state by recrystallization from acetic ester in the form of colorless needles. Melting point 113.

Analysis: $C_{17}H_{29}O_2N_2Cl$:
Calculated N= 8.52   Found= 8.30%
           Cl=10.79          =10.89%

(5.) p-N-isoamylaminobenzoic acid β-diethylaminoethylester: p-N-isoamylaminobenzoic acid ethylester—obtained from the acid as a crystalline mass, melting point 68°, (Comp. Houben and Freund Ber. 46 (1913) 3833) by boiling with ethylalcohol containing hydrogenchloride and subsequently decomposing the product with a solution of sodium carbonate—is slowly heated with the β-diethylamino-ethylaleohol in excess and with a small quantity of sodium ethylate serving as a catalyzer. Ethylalcohol splits off and distills over. The remaining reaction product is dissolved in diluted acetic acid, any unaltered ethylester which may still be present is removed by subjecting the solution to a treatment with ether, and the diethylamino-ethylester is separated by supersaturating the aqueous solution with a solution of sodium carbonate. The solution is treated with ether, dried over potassium carbonate and distilled from all substances which separate in vacuo at a temperature of the water bath. The remaining p-N-isoamylaminobenzoic acid β-diethylaminoethylester forms an oil of a light brownish color and is entirely pure.

Analysis: $C_{18}H_{29}O_2N_2$:
Calculated C=70.52%   Found=70.33%
           H= 9.87%         =10.29%
           N= 9.17%         = 8.88%

(6) p-N-propylaminobenzoic acid β-piperidino-ethylester: A mixture from p-N-propylaminobenzoic acid ethylester and β-piperidino-ethylalcohol in excess after addition thereto of a small quantity of sodium ethylate is heated, whereupon ethyl alcohol is split off and distills over. The product of the reaction is then treated with alcohol, neutralized with alcoholic hydrochloric acid while cooling and from the filtered solution the monohydrochloride is precipitated. The product, which at first comes out as an oil but soon solidifies when triturated, is obtained in an entirely pure state by recrystallization from a mixture of alcohol and acetic ester. Melting point 157–158°.

Analysis for $C_{17}H_{27}O_2N_2Cl$:
Calculated N= 8.57%   Found= 8.67%
           Cl=10.85%          =11.00%

(7.) p-N-β-methoxyethylaminobenzoic acid β-piperidino-ethylester: A mixture of p-N-β-methoxyethylaminobenzoic acid ethylester (obtained from the acid in the usual manner by esterification with ethyl alcohol, an oil of boiling point 8 mm. 199–200°) and β-piperidino-ethylalcohol to which a small quantity of sodium ethylate is added as a catalyst, is boiled so that the ethyl alcohol which splits off distills over. By further working up the product of the reaction in the manner indicated in example 6, the monohydrochloride of the p-N-β-methoxyethylaminobenzoic acid β-piperidino-ethylester is obtained as a colorless crystalline powder melting at 138°.

Analysis for $C_{17}H_{27}O_3N_2Cl$:
Calculated C=59.53%  Found=59.40%
H= 7.95%   = 7.91%
N= 8.18%   = 8.21%
Cl=10.35%  =10.24%

(8.) p-N-propylaminobenzoic acid β-diethylamino-ethylester: Equimolecular quantities of p-aminobenzoic acid β-diethylamino-ethylester and propyl bromide are boiled in the oil bath for 5 hours under reflux and while adding propyl alcohol as a diluting agent. The solution remains homogeneous when, after cooling, water is added thereto; it gives a neutral or slightly acid reaction which proves that all of the base has been converted into a salt. For eliminating the propyl alcohol the solution is treated with ether and then supersaturated with a dilute solution of sodium carbonate. The alkaminester is thus separated as an oil, whilst simultaneously formed quaternary ammonium salts remain in solution. After treating the product with ether and drying the ethereal solution over sodium carbonate there is obtained by fractional distillation in vacuo the p-N-propylaminobenzoic acid diethylamino-ethylester as an oil boiling at 217° under 7 mm. pressure. The monohydrochloride is produced by mixing the base with an equimolecular quantity of alcoholic hydrochloric acid and precipitating it with ether; after recrystallization from acetone it shows a melting point of 103–104°. It forms a colorless crystalline powder.

(9.) p-N-β-methoxyethylaminobenzoic acid β-diethylamino-ethylester: A mixture consisting of 1 molecule of p-aminobenzoic acid β-diethylamino-ethylester, 1, 1 molecule of β-chloroethylmethylether and about twice the quantity by weight of ethylene glycol—the latter as a diluting agent—is boiled in an oil bath for several days under reflux. To the mixture is added water and it is then shaken with ether wherein that part of the parent material which has not entered into reaction is dissolved. On addition of a solution of sodium carbonate an oil precipitates from the clear aqueous solution, which after being treated with ether and dried over potassium carbonate yields by fractionation in vacuo a fractionation product boiling under 9 mm. pressure at 245–250°, constituting an almost pure p-N-β-methoxyethylaminobenzoic acid β-diethylamino-ethylester. By dissolving it in the equimolecular quantity of alcoholic hydrochloric acid and precipitating with ether the monohydrochloride is obtained which soon solidifies and which, by recrystallization from formic acid ethylester becomes entirely pure, forming a colorless crystalline powder melting at 86°.

I claim:

1. The process for preparing alkaminesters of the p-aminobenzoic acids monosubstituted at the nitrogen having the formula:

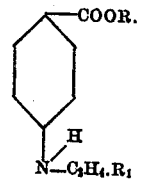

wherein R stands for an alkamine residue and $R_1$ for an alkyl- or alkyloxy residue, which consists in substituting in p-aminobenzoic acid in any desired order for the hydrogen atom of the carboxyl group an alkamine residue and for a hydrogen atom of the amino group an alkyl- or an alkyloxyalkyl residue containing more than two carbon atoms and then converting the bases so obtained into their water soluble salts.

2. The process for preparing p-N-methoxyethylaminobenzoic acid alkaminester, which consists in substituting in p-aminobenzoic acid, in any desired order, for the hydrogen atom of the carboxyl group an alkamine residue and for a hydrogen atom of the amino group the methoxy-ethyl residue, and then converting the bases so obtained into their water soluble salts.

3. The process for preparing p-N-alkylaminobenzoic acid piperidino-ethylester, which consists in substituting in p-aminobenzoic acid, in any desired order, for the hydrogen atom of the carboxyl group the piperidino-ethyl residue and for a hydrogen atom of the amino group an alkyl- or alkyloxyalkyl residue containing more than two carbon atoms, and then converting the bases so obtained into their water soluble salts.

4. The process for preparing p-N-methoxyethylaminobenzoic acid piperidino-ethylester, which consists in substituting in p-aminobenzoic acid, in any desired order, for the hydrogen atom of the carboxyl group the piperidino-ethyl residue and for a hydrogen atom of the amino group the methoxyethyl residue, and then converting the base so obtained into its water soluble salts.

5. The process for preparing p-N-methoxyethylaminobenzoic acid piperidino-ethyl-ester, which consists in substituting in p-aminobenzoic acid, in any desired order, for the hydrogen atom of the carboxyl group the piperidino-ethyl residue and for a hydrogen atom of the amino group the methoxyethyl residue, and then converting the base so obtained into its hydrochloric salt.

6. As new products, the bodies of the formula:

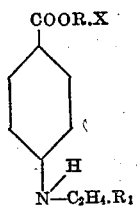

wherein R stands for an alkamine residue, $R_1$ for an alkyl- or alkyloxy residue and X for an acid which renders the bodies water soluble.

7. As new products, the bodies of the formula:

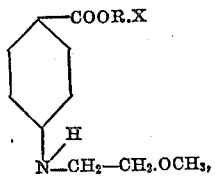

wherein R stands for an alkamine residue and X for an acid which renders the bodies water soluble.

8. As new products, the bodies of the formula:

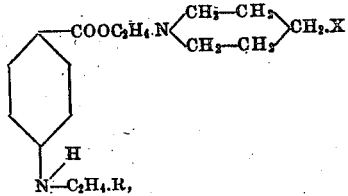

wherein R stands for an alkyl- or alkyloxy residue, X for an acid which renders the bodies water soluble.

9. As new products, the bodies of the formula:

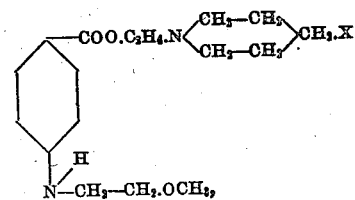

wherein X stands for an acid which renders the bodies water soluble.

10. As a new product, the body of the formula:

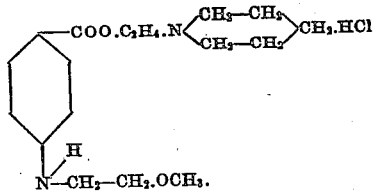

In testimony whereof, I affix my signature.

OTTO EISLEB.